(12) United States Patent
Avadhanam

(10) Patent No.: US 12,511,155 B2
(45) Date of Patent: Dec. 30, 2025

(54) REAL-TIME MONITORING FOR RANSOMWARE ATTACKS USING EXCEPTION-LEVEL TRANSITION METRICS

(71) Applicant: Oracle International Corporation, Redwood Shores, CA (US)

(72) Inventor: Phani Bhushan Avadhanam, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 631 days.

(21) Appl. No.: 17/743,950

(22) Filed: May 13, 2022

(65) Prior Publication Data
US 2023/0367628 A1 Nov. 16, 2023

(51) Int. Cl.
G06F 21/56 (2013.01)
G06F 9/48 (2006.01)
H04L 9/40 (2022.01)

(52) U.S. Cl.
CPC ........ *G06F 9/4856* (2013.01); *H04L 63/1466* (2013.01)

(58) Field of Classification Search
None
See application file for complete search history.

(56) References Cited

U.S. PATENT DOCUMENTS

| | | | |
|---|---|---|---|
| 2014/0188969 A1* | 7/2014 | Chotai | G06F 17/16 708/520 |
| 2018/0075234 A1* | 3/2018 | Boutnaru | G06F 21/554 |
| 2021/0097181 A1 | 4/2021 | Reid et al. | |
| 2021/0383010 A1* | 12/2021 | Massiglia | G06F 11/2092 |

OTHER PUBLICATIONS

Muna et al., "Targeted Ransomware: A New Cyber Threat to Edge System of Brownfield Industrial Internet of Things", Aug. 4, 2019, IEEE Internet of Things Journal, IEEE, vol. 6, No. 4, pp. 7137-7151. (Year: 2019).*
Al-Hawawreh Muna et al., "Targeted Ransomware: A New Cyber Threat to Edge System of Brownfield Industrial Internet of Things", IEEE Internet of Things Journal, vol. 6, No. 4, Aug. 2019, pp. 1-15.

* cited by examiner

*Primary Examiner* — Nelson S. Giddins
(74) *Attorney, Agent, or Firm* — Invoke

(57) ABSTRACT

Aspects of the disclosure include a dynamic cloud workload reallocation based on an active ransomware attack. An example method includes receiving a first message that a computing instance is potentially infected by ransomware. The method further includes receiving a security state-based metric related to the computing instance based at least in part on the first message. The method further includes comparing the security state-based metric to a threshold metric. The method further incudes determining a likelihood of a ransomware attack based at least in part on the comparison. The method further includes transmitting second message to a job scheduler to reschedule workloads directed toward the computing instance based at least in part on the determination.

20 Claims, 13 Drawing Sheets

REAL-TIME MONITORING FOR RANSOMWARE ATTACKS USING EXCEPTION-LEVEL TRANSITION METRICS

BACKGROUND

A cloud computing environment includes a combination of a cloud computing infrastructure layer, a cloud platform layer, and an application layer. Each of these layers further includes sub-elements to permit a cloud computing system to deliver services to its customers. Each of these cloud computing layers and elements can provide an opportunity for a bad actor to subvert security measures and harm the functioning of the cloud computing environment.

BRIEF SUMMARY

The present embodiments relate to dynamic cloud workload reallocation based on an active ransomware attack. A first example embodiments provides a computer-implemented method for dynamic workload reallocation. The method can include receiving, by a cloud infrastructure node, a first message that a computing instance is potentially infected by ransomware.

The computer-implemented method can further include receiving, by the cloud infrastructure node, a security state-based metric related to the computing instance based at least in part on the first message.

The computer-implemented method can further include comparing, by the cloud infrastructure node, the security state-based metric to a threshold metric.

The computer-implemented method can further include determining, by the cloud infrastructure node, a likelihood of a ransomware attack based at least in part on the comparison.

The computer-implemented method can further include transmitting, by the cloud infrastructure node, a second message to a job scheduler to reschedule workloads directed toward the computing instance based at least in part on the determination.

A second embodiment related to a cloud infrastructure node. The cloud infrastructure node can include a processor and a non-transitory computer-readable medium. The non-transitory computer-readable medium can include instructions that, when executed by the processor, cause the processor to receive a first message that a computing instance is potentially infected by ransomware.

The instructions can further cause the processor to receive a security state-based metric related to the computing instance based at least in part on the first message.

The instructions can further cause the processor to compare the security state-based metric to a threshold metric.

The instructions can further cause the processor to determine a likelihood of a ransomware attack based at least in part on the comparison.

The instructions can further cause the processor to transmit a second message to a job scheduler to reschedule workloads directed toward the computing instance based at least in part on the determination.

A third embodiment relates to a non-transitory computer-readable medium. The non-transitory computer-readable medium can include stored thereon a sequence of instructions which, when executed by a processor, cause the processor to execute a process. The process can include receiving a first message that a computing instance is potentially infected by ransomware.

The process can further include receiving a security state-based metric related to the computing instance based at least in part on the first message.

The process can further include comparing the security state-based metric to a threshold metric.

The process can further include determining a likelihood of a ransomware attack based at least in part on the comparison.

The process can further include transmitting a second message to a job scheduler to reschedule workloads directed toward the computing instance based at least in part on the determination.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Many cloud computing systems are vulnerable to active security exploits such as a ransomware attack. A ransomware attack can include a malicious memory/disk encryption using a secret key. Further, a ransomware attacker can encrypt client data and hold the data for ransom. Failure to provide the ransom can result in the deletion of the client data or inappropriate dissemination of the client data.

Ransomware attacks have evolved to the point that many attacks can bypass standard anti-virus protections. Furthermore, ransomware can be designed to attack specific targets, such as the hardware of a cloud computing system. Three example ransomware attacks include Full Disk Encryption, Broken Object Level Authorization (BOLA), and Rowhammer-style attacks. Laptops and servers are particularly prone to these hardware level ransomware attacks. Once a laptop or a server that is connected to a cloud environment is successfully attacked by ransomware, the laptop or server can become a gateway for a malicious to cause further damage to a cloud system.

Embodiments of the present disclosure address the above-referenced issues by tailoring detection mechanisms to distinguish between transient encryption/decryption, and sustained encryption/decryptions, where a transient encryption/decryption is based on a legitimate transaction and the sustained encryption/decryption is indicative of a ransomware attack. A detection mechanism can detect a trigger that ransomware has infected a cloud computing instance. Once the detection mechanism has been triggered, the mechanism can collect data related to a security state (e.g., secure state and non-secure state) of a cloud infrastructure node. The detection mechanism can further determine whether a ransomware attack has likely occurred based on the security state data.

Figure 1:
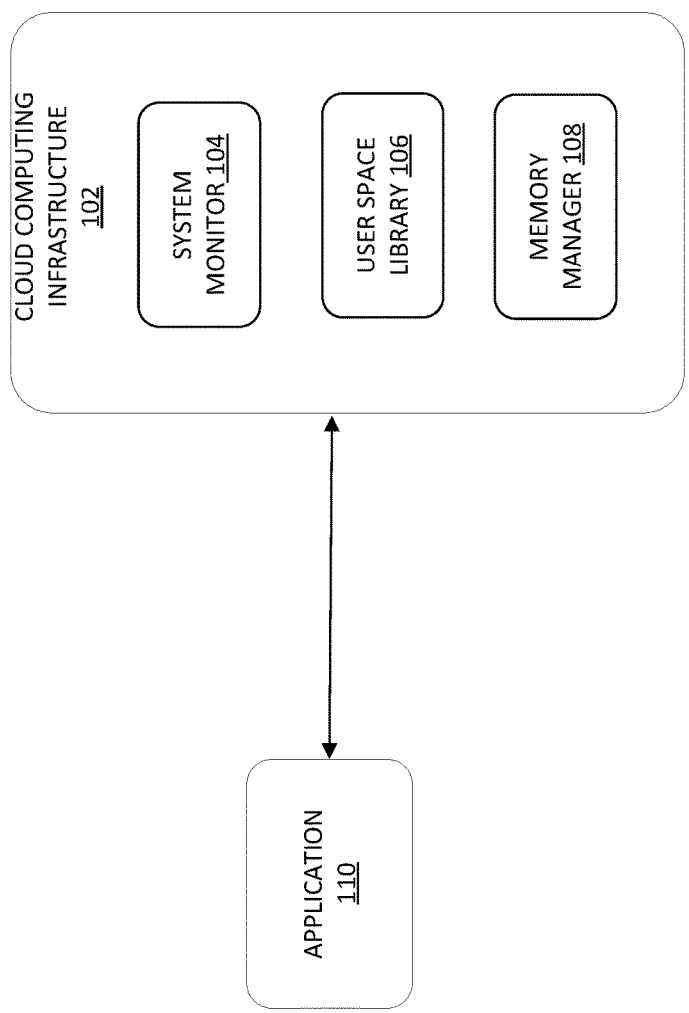
FIG. 1 is a block diagram of an example system for identifying ransomware, according to one or more embodiments.

FIG. 1 is a block diagram illustrating an example system 100 for identification and mitigation of a ransomware attack in a cloud computing infrastructure 102. The system 100 can include a system monitor 104 for detecting and monitoring encryption/decryption of assembly instructions at a kernel-level. The system monitor 104 can, for example, detect and monitor the encryption instructions as the instructions are read into an instruction cache from memory or when assembly-level instructions are executed. The system monitor 104 can include low-level memory monitoring resources to detect encryption/decryption instructions. The system monitor 102 can read memory rows to identify any encryption instructions being provided to memory. The encryption/decryption instructions can be aggregated to determine whether a threshold number of changes in memory occur, validating a ransomware attack at the memory. The system monitor 104 can further monitor a security state of a processing element (PE) of a cloud computing infrastructure 102. For example, the system monitor can detect when a PE is a secure state or a non-secure state.

The system 100 can further include a user space library 106 including a collection of functions that can initiate the monitoring of low-level memory. The user space library 106 can be software that enables communication between an operating system and an application executing on the operating system. In some embodiments, the user space library 106 can be multiplexed across libraries at the platform layer of a cloud environment.

The system 100 can further include a memory translator 108. A memory translator 108 can interact with a memory map to provide cache mapping and un-mapping functions to an application. Each time that an application is introduced into a cloud to a cloud computing instance, the application provides a set of instructions for interacting with the hardware. The memory translator 108 can direct the application as to, for example, a placement strategy, and replacement strategy, and a read and write policy for the instructions provided by the application.

The system 100 can interact with an application 110. The application 110 can potentially include ransomware that maliciously encrypts data within the cloud computing infrastructure.

Figure 2:
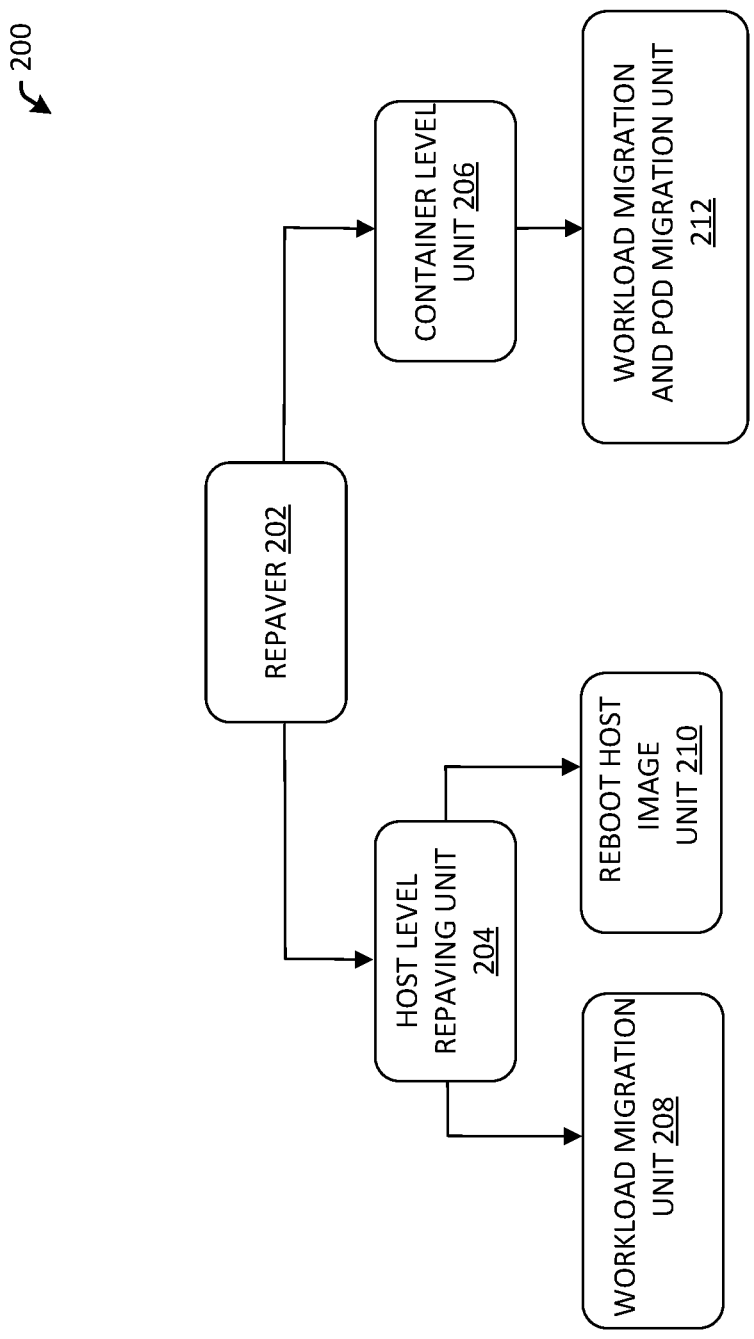
FIG. 2 is a block diagram of an example system for repaving, according to one or more embodiments.

Referring to FIG. 2, a repaving system 200 for migrating computing resources (e.g., or workloads), wiping memory, and making requests to perform computing tasks from affected computing instances is shown. Repaving can include restoring a state of an instance to a state prior to the security breach. For example, the repaver 202 can restore a state of workload if ransomware has been introduced to the workload. The repaver 202 can further migrate workloads from an instance affected by ransomware to an unaffected instance. The repaver 202 can include a host-level repaving unit 204 for repaving resources at a host-level and a container-level repaving unit 206 for repaving resources at a container level. The host-level repaving unit 204 can include a workload migration unit 208 for repaving workloads from affected computing instances at a host level. Further, the host-level repaving unit 204 can include a reboot host image unit 210 for repaving a host image for the affected computing instances. The container-level repaving unit 206 can include a workload migration and pod migration module 212 for repaving workloads from the affected computing instances.

Figure 3:
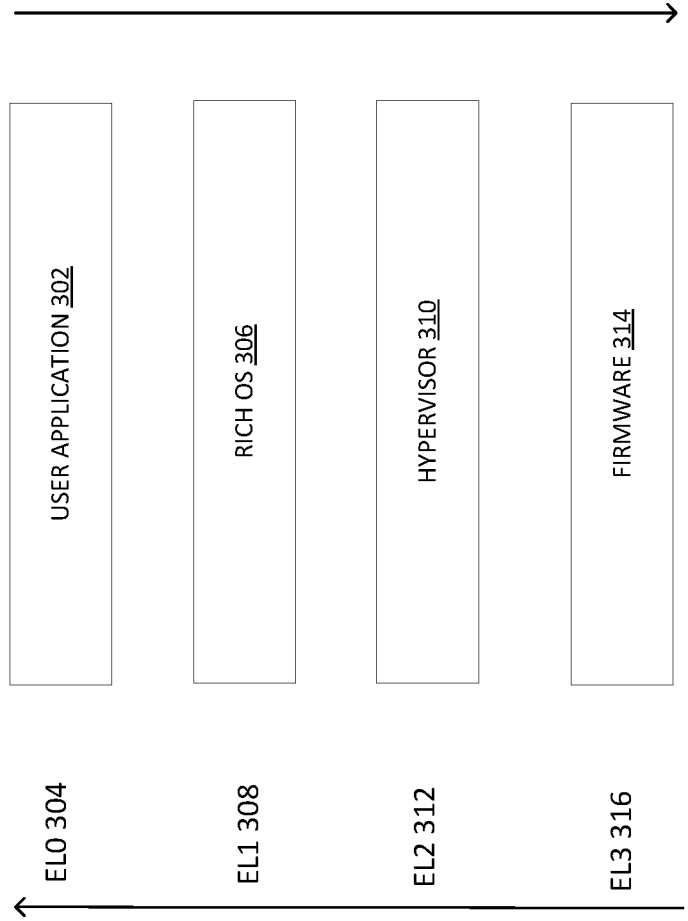
FIG. 3 is a block diagram illustrating exception levels of a system, according to one or more embodiments.

Referring to FIG. 3, an example system 300 with indicated exception levels in accordance with some embodiments is shown. As illustrated, the system 200 can include a user application 202 operating at an exception level 0 204 (EL0), an operating system 206 operating at an exception level one 208 (EL1), a hypervisor 210 operating at an exception level two 212 (EL2), and a firmware 214 operating at an exception level three 216 (EL3). Different applications can be associated with different modules, in which each module has a different privilege level of access to a system or processor resources. As illustrated, an exception level is associated with a privilege level for accessing system and processor resources. For example, an operating system 206 operating at EL1 208 can have a higher level of access to a system and processor resources than a user application 202 operating at EL0 204. With respect to embodiments described herein, an EL can be indicative that an application's privilege is often times associated with a current EL. In a conventional implementation, a user application can operate at a low-level privilege, in which access to system and processor resources are the most restricted, an operating system can operate at a mid-level privilege, in which access to system and processor resources are less restricted than a low-level privilege, and a firmware can operate at a high-level privilege, in which access to system and processor resources are the least restricted. It should be appreciated that El states are not static, and a PE can, in one instance, operate at a first EL state and, in another instance, operate at a second EL state.

An EL can affect an application's access to both memory and processor resources. An application can assign attributes to different memory regions, including read/write permissions. The attributes can further be configured to allow for separate access permissions for privileged and unprivileged access. For example, if a processor is acting at EL0 and attempts to access memory, the access attempt can be checked against unprivileged access permission. If, however, the processor, is acting at EL1 or above, the access attempt is checked against privileged access permission. In addition to memory, access to system registers can be based on an EL. For example, system registers that hold the configurations for a system can be configured to only be accessed based on an EL.

Figure 4:
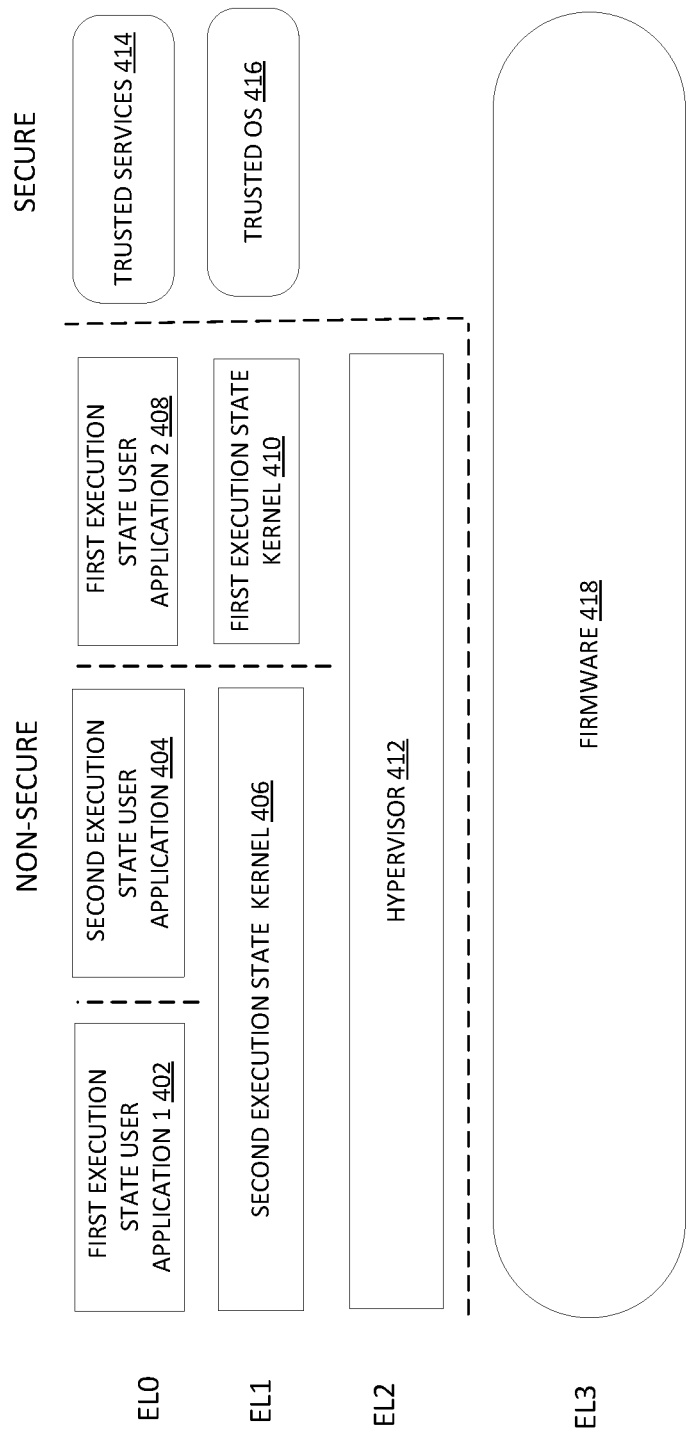
FIG. 4. is a block diagram illustrating a system having elements in a secure state and a non-secure state, according to one or more embodiments.

Referring to FIG. 4, an illustration 400 for describing ELs, security states, and execution states of a system according to some embodiments is shown. A state of a processor can be dependent on an EL and an execution state. The execution state can define a general width of a register and available instruction set. A processor architecture can allow for the implementation of multiple execution states. A security state can determine which ELs are currently valid. The processor architecture can further allow for the implementation of different security states (e.g., secure state and on-secure state). For example, a processor architecture can allow for a secure state, in which a processor can access secure and non-secure system registers. The processor architecture can allow for a non-secure state, in which the processor can access non-secure address space.

As seen in FIG. 4, elements of a cloud computing system are illustrated to show ELs and security states. As illustrated, a first execution state user application one 402, a second execution state user application 404, a second execution state kernel 406, a first execution state user application two 408, a first execution state kernel 410, and a hypervisor are in a non-secure state. A first execution state can be, for example, a 32-bit state, whereas a second execution state can be, for example, a 64-bit execution state. For illustration, each element in the non-secure state is illustrated as a rectangle. As further illustrated, a trusted service 414, a trusted operating system 416, and a firmware 418 are in a secure state. For illustration purposes, the secure state elements are illustrated as rounded rectangles. As further illustrated each element can further be associated with an EL as described with respect to FIG. 3. Each of the elements can access system and processor resources, based on their execution states, ELs, and security states. For example, the hypervisor 412 can access non-secure address space at an EL2 permission level. The firmware 418, on the other hand, can access secure memory at an EL3 permission level.

Figure 5:
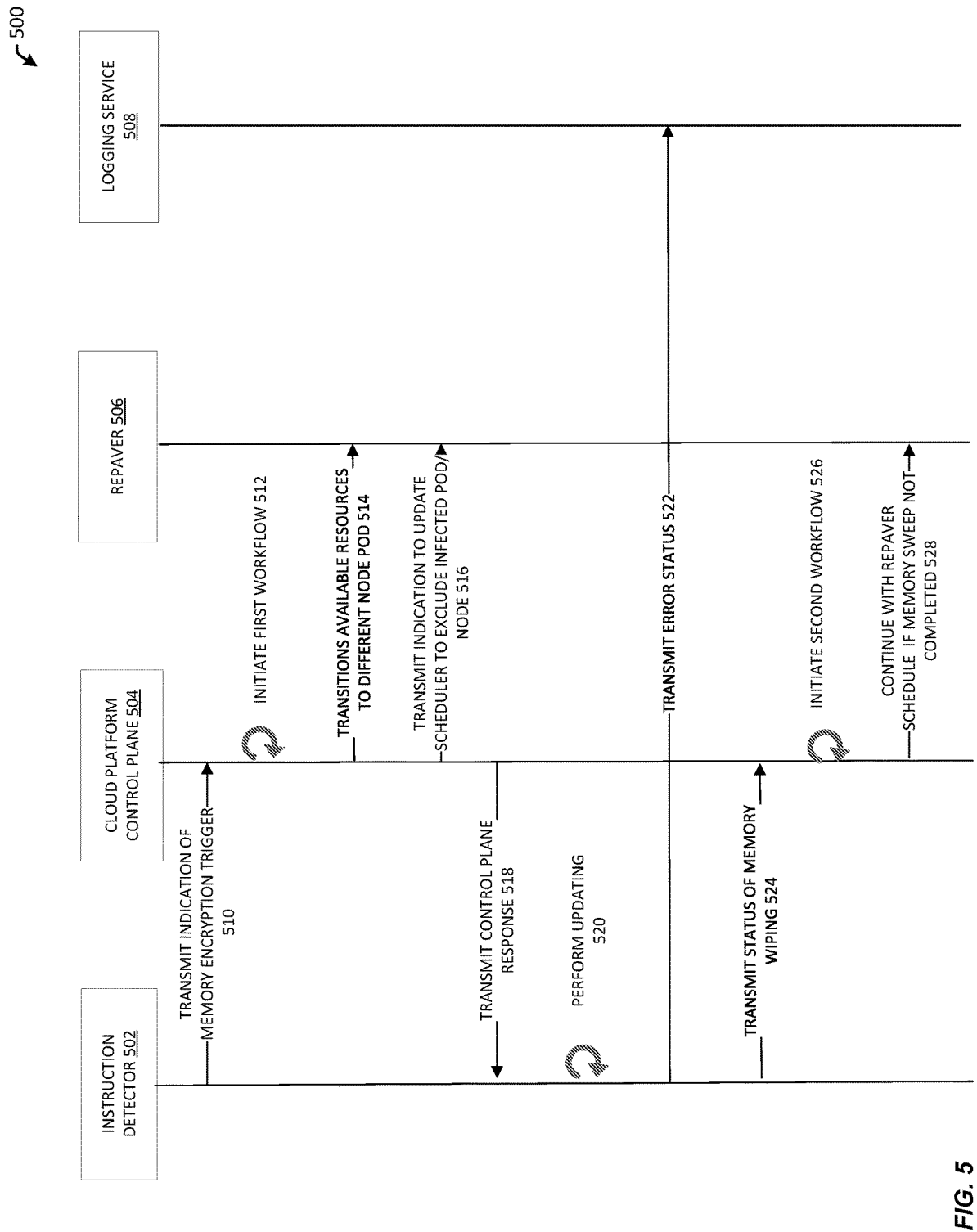
FIG. 5 is a signaling diagram for identifying ransomware, according to one or more embodiments.

Referring to FIG. 5, a signaling diagram 500 for identifying a ransomware attack according to some embodiments is shown. As illustrated, an instruction detector 502, a cloud platform control plane 504, a repaver 506, and a logging service 508 can be in operable communication. While the operations of processes 500, 600, 700, and 800 are described as being performed by generic computers, it should be understood that any suitable device (e.g., a user device, a server device) may be used to perform one or more operations of these processes. Processes 500, 600, 700, and 800 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At 510, an instruction detector 502 can transmit an indication to a cloud platform control plane 504 that a memory encryption trigger has occurred. This can be performed responsive to validating the instructions as likely comprising a ransomware attack. For example, detecting that a threshold number of modifications have occurred between a cache and memory.

At 512, the cloud platform control plane 504 can initiate a first workflow. The first workflow can allow for the identification of victim computing instances and the identification of other computing instances available to take over workloads. For instance, the cloud platform control plane 504 can identify available resources across a cloud infrastructure service. The identification can be based on comparing metrics to key performance indicators (KPIs). The metrics can be collected from an and/or based on an application profile, system usage (e.g., duration, how often an instance has been created, number of times a user has logged on, and other disk level thresholds). The KPIs can be based on a security state of one or more PEs. For example, a number of times that a processor invokes an EL is indicative of a secure state. For example, in some instances an EL3 is indicative of a secure state. Therefore, if a processor changes to an EL3 state from an EL2, EL1, or EL0 state, this is indicative of moving from a non-secure state to a secure state. A secure state, in turn, can be indicative that encryption/decryption is occurring. Another KPI can be a length of time that a node operates in a secure state. Yet another KPI can be a number of times that a transition into a secure state failed. Yet even another KPI can be a number of requests to invoke a secure state transition that returned a "too many requests error."

Responsive to not detecting any instructions relating to encryption, a result can indicate no encryption was detected. Alternatively, if instructions to encrypt data are detected, a change in memory contents for each chunk of memory rows can be calculated. The results can be compared with a threshold to determine whether the instructions exceed a threshold amount. Further, the results can be processed to determine whether the instructions comprise a false positive. Responsive to the results being verified, which is indicative of a ransomware attack likely occurring, a trigger can be created for repaving of the victim computing instances, migrating workload to non-affected instances, and modifying a scheduler to not schedule workloads on affected instances.

In some instances, instructions to encrypt and decrypt data can be analyzed to validate results and remove false positive instances of identified likely ransomware attacks via cryptographic bitmap. As described above, a user space library can observe the cache over a configurable time window. For example, the user space library can observe data be written into and read out of a cache over a three second time window. The user space library can further retrieve historical data from the cache over a similar time window. The historical data, assuming no malicious encryption was observed at the time, serves as a benchmark for current data. The user space library can compare the two datasets and determine if a difference (e.g., a delta) between the two data sets suggests that malicious encryption has occurred.

In some embodiments, a cryptographic bitmap can be generated to include a bitmap of instructions identified for each memory row. A mathematical exclusive or (XOR) operation can be performed for bitmaps for adjacent memory rows. A delta value can be derived as a result of the XOR operation for each set of adjacent bitmaps, and a summation of the delta values can be derived by aggregating the delta values. If the total sum of summated delta values exceeds a threshold, encryption/decryption can be identified.

Alternatively, the system can continue accumulating instructions identified in the memory set. In some instances, a data analytic function, such as a min, max, standard, deviation can be used to arrive at possible threshold variants.

At 514, the cloud platform control plane 504 can send a notification to transition available resources to a different node/pod to a cloud repaver mechanism 506. The notification can identify victim resources and request workloads be transitioned to identified resources.

At 516, the cloud platform control plane 504 can send an indication to a repaver 506 to update a scheduler. This scheduler can exclude a victim pod/node/computing instance from obtaining/executing corresponding workloads.

At 518, the cloud platform control plane 504 can send a cloud control plane response to a ransomware instruction detector 502. This can be sent responsive to updating the scheduler and transitioning resources.

At 520, the instruction detector 502 can update encryption KPIs. This can be performed responsive to a successful receipt of the cloud control plane response of 518. Updating the encryption KPIs can include updating a memory map with a type of memory, encryption types, and an address range/bucket.

At 522, the instruction detector 502 can send an error message to a logging service 508. This can be sent in the event that a failure occurred in updating the bitmap.

At 524, the instruction detector 502 can send a status of whether memory has been swept to cloud platform control plane 504.

At 526, a second workflow is initiated at cloud platform control plane 504. The second workflow can include a state transition and database updates.

At 528, the cloud platform control plane 504 can send a notification to continue with the repaver schedule if the memory sweep is not complete to the cloud repaver mechanism 506. The continuation with the same schedule can be with the same repaver node set and the same repaver algorithm.

In some embodiments, a randomness of memory zone and statistical profiling can be introduced to identify malicious encryption. Memory can be provided at different zones, for example, a cache or a main memory. The cache is further subdivided into cache levels, such as level 1 cache, level 2 cache, and level 3 cache. In some embodiments, level 1 cache can further include an instruction cache and a data cache. A ransomware can be configured to infect specific memory, for example, the data cache or level 2 cache. Furthermore, during a ransomware attack, a respective percentage of data in the different caches that is maliciously encrypted are different for each cache. Therefore, to introduce a baseline for the caches (e.g., instruction cache, data cache, and level 2 cache), the caches are statistically profiled and sampled.

The herein described embodiments can employ various statistical profiling techniques for each of the caches. For example, the herein described embodiments can employ a statistical profiling extension (SPE) technique. Using SPE, a processor can select from a population of operations that are being executed in a processor pipeline. These operations can be, for example, architectural instructions or microoperations, and can be tracked along a processor pipeline. The processor can further implement a sampling interval for collecting data. Each time that a sample is collected, pursuant to the interval, the data is stored in a memory buffer. Each instance that the buffer is filled is an indication for a software to process the data.

The statistical profiling enables a non-invasive methodology for sampling software and hardware using randomized sampling of each of the caches. The sampling can be of architectural instructions as defined by an instruction set architecture or of microarchitectural operations. In some instances, a processor is sampling a multi-threaded process. In these instances, the sampling interval is determined per thread that is being profiled. The sampled data can further be compared against threshold values (e.g., KPI-based threshold values).

In some embodiments, the herein described methodology can be applied to different encryption/decryption categories. For example, the methodologies can be applied to single encryption and decryption, multiple encryption and decryption, cache encryptions including instruction cache and data cache encryptions, and associated encryption failures.

In some embodiments, different encryption categories can be associated with different threshold values for identifying a ransomware attack. In other words, different KPIs, such as security state-based KPIs, are established based on an encryption category. For example, a weighted average threshold can be applied to single and multiple encryption and decryptions. For each encryption and decryption that is identified, an exponential mathematical equation can be applied. Calculating this equation can result in a cumulative sum of floating-point numbers. Calculating this score can even on transient encryptions and decryptions, which can be recovered at the lower levels of the software/hardware. Once these floating-point numbers are averaged, the following processes 600 and 700 can take place.

Figure 6:
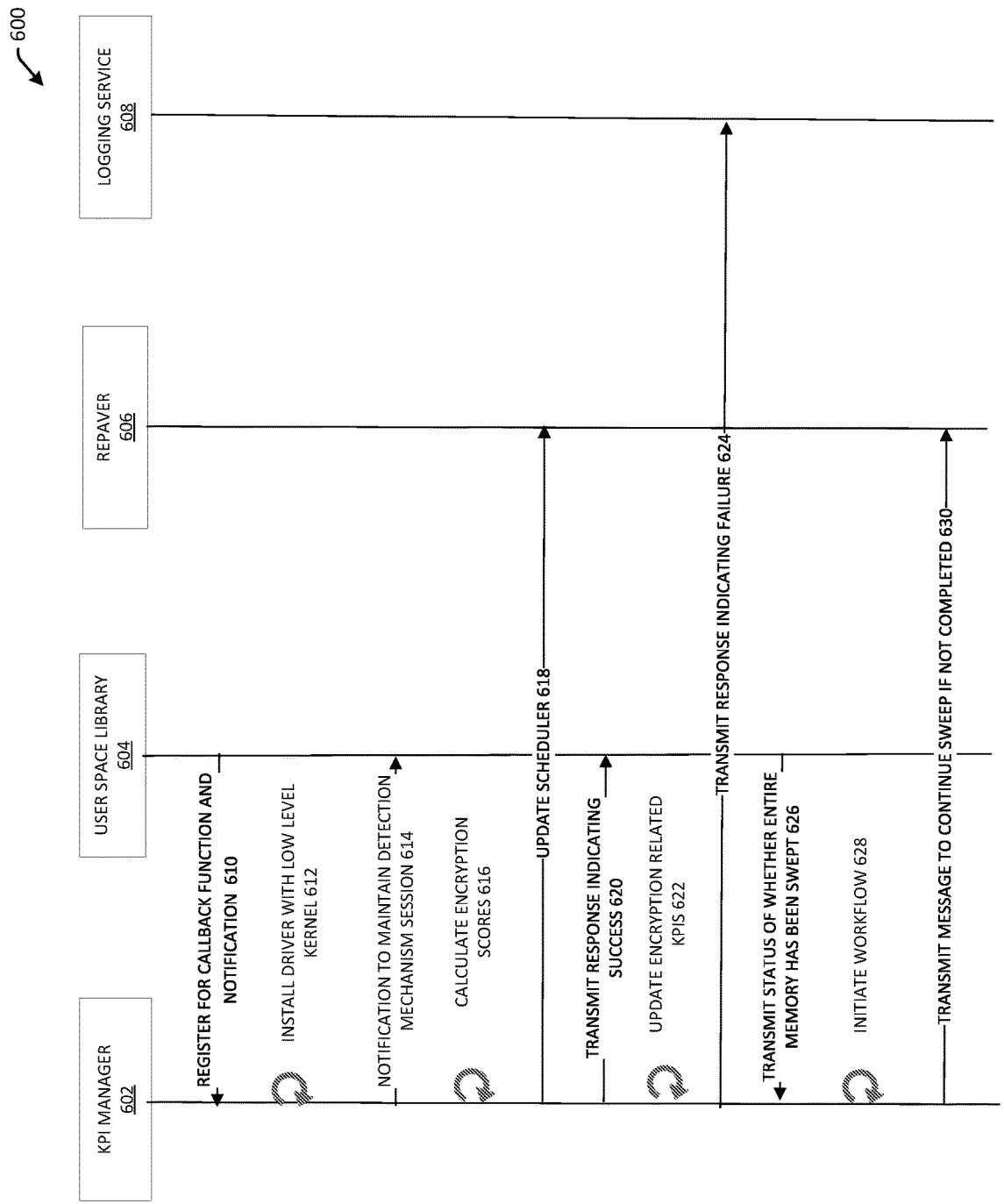
FIG. 6 is a signaling diagram for identifying ransomware, according to one or more embodiments.

Referring to FIG. 6, a process 600 for identifying ransomware according to some embodiments is shown. As illustrated, a KPI manager 602, a user space library 604, a repaver 606, and logging service 608 can be in communication. At 610, the KPI manager 602 can register for callback and notifications from the user space library 604. This registration can be for an instruction cache, a data cache, an overall DRAM, and other memory computing instances of interest. Furthermore, during a workload operation, security state information can be mapped to a respective host instance, thread count, and workload profile. This can be replicated across a cloud computing environment, and the threads can be validated against malicious and legitimate encryption cases.

At 612, the KPI manager 602 can install a driver with a low-level kernel (e.g., a kernel image). This can include registering memory devices (e.g., caches, DRAM) for monitoring. This also can establish a communication channel or suspend a communication channel until a trigger event occurs.

At 614, the KPI manager 602 can send a notification to a user space library 604 to maintain a session of a detection mechanism. The user space library 604 can be a collection of functions configured for ransomware detection. This can include a notification for a refresh or a scan for a change in the configuration of the detection mechanism. This can further include an acknowledgement that the driver has been installed with the low-level kernel.

At 616, the KPI manager 602 can calculate one or more scores. The scores can include encryption category scores and location-based scores, such as a single encryption score, a multi encryption score, and a score for an instruction cache and a data cache. The scores can change based on a difference of a number of encryptions versus a number of decryptions. This can include comparing scores with previously calibrated scores (e.g., KPI-based threshold scores). In some instances, as an encryption delta grows over time (e.g., more instructions for encryption over instructions for decryptions are identified), the score can be assigned a multiplier.

At 618, the KPI manager 602 can update the cloud scheduler to the cloud repaver mechanism 606. Updating the cloud scheduler can include excluding a Pod, node or compute instance, if an indication of ransomware is detected based on a score comparison.

At 620, the KPI manager 602 can send a cloud control plane response to the user space library 604 indicating a success if a cryptographic bitmap was successfully updated.

At 622, the user space library 604 can update security state-related KPIs. This can be performed responsive to a successful receipt of the cloud control plane response 620. Updating the encryption KPIs can include updating a memory map with a type of memory, encryption types, and an address range/bucket.

At 624, the user space library 604 can send an error message to the logging service 608 if updating a cryptographic bitmap is a failure. This can be sent responsive to an encryption bitmap update failure.

At 626, user space library 604 can provide a status of whether memory has been swept to the KPI manager 602.

At 628, the KPI manager 602 can initiate a second workflow. The second workflow can include identifying security state transitions and updating a database.

At 630, the KPI manager 602 can send a message to continue with the repaver schedule if memory sweep is not complete to the cloud repaver 806. The continuation with the same schedule can be with the same repaver node set and the same repaver algorithm.

Figure 7:
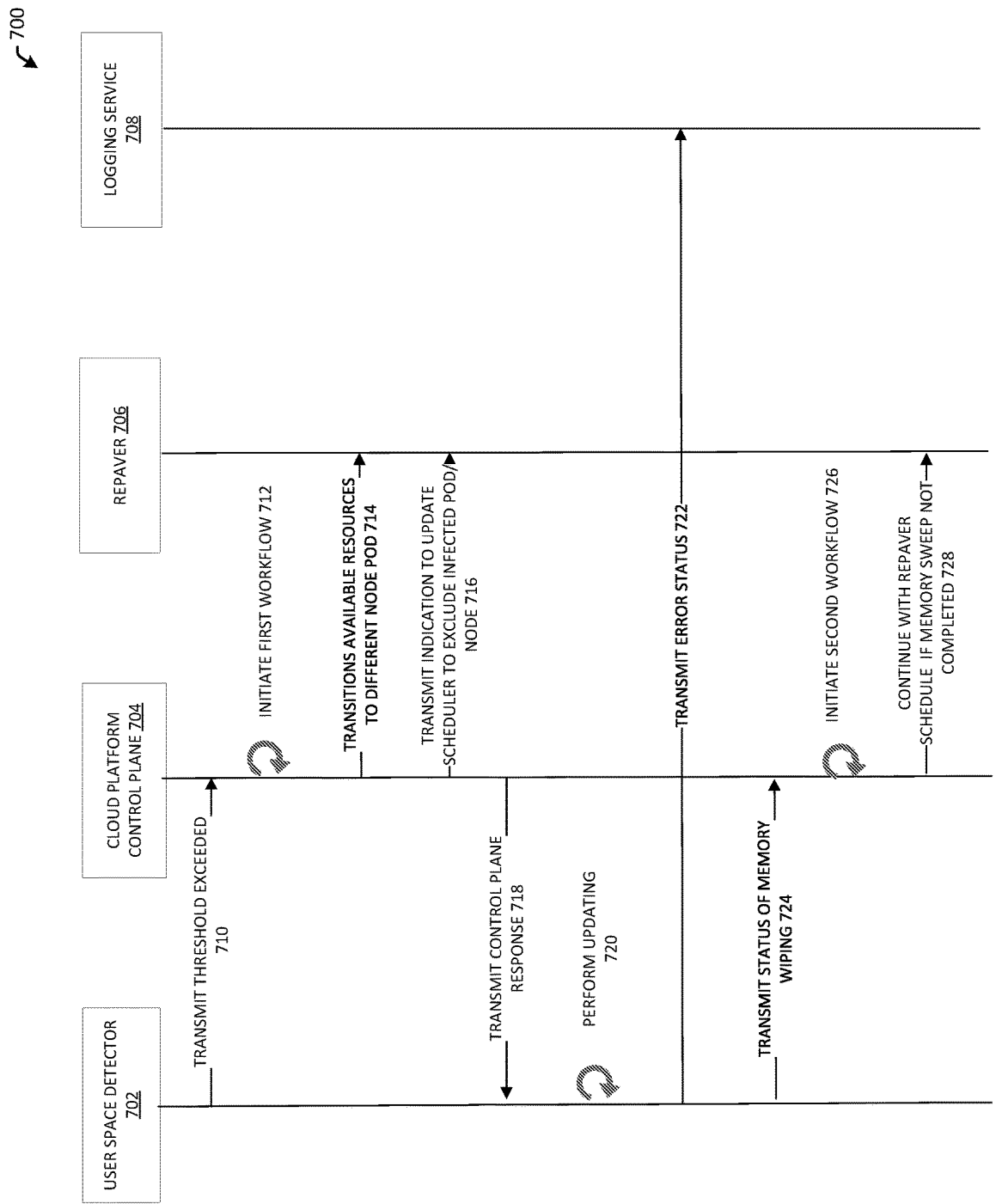
FIG. 7 is a signaling diagram for identifying ransomware, according to one or more embodiments.

Referring to FIG. 7, a signaling diagram 700 for identifying a ransomware attack according to some embodiments is shown. At 710, a user space detector 702 can transmit an indication to a cloud platform control plane 704 that a memory encryption trigger has occurred. The cloud platform control plane 704 can be a node in a cloud computing system. This can be performed responsive to validating the instructions as likely comprising a ransomware attack. For example, determining that a number of transitions into a secure state has exceeded a threshold number of thresholds into the secure state.

At 712, the cloud platform control plane 704 can initiate a first workflow. The first workflow can allow for the identification of victim computing instances and identification of other computing instances available to take over workloads. For instance, the cloud platform control plane 704 can identify available resources across the CI service. The identification can be based on comparing metrics to security state based-KPIs, as described above. In some embodiments, the cloud platform control plane 704 can identify false positives, as described above.

At 714, the cloud platform control plane 704 can send a notification to transition available resources to a different node/pod to a repaver 706. The notification can identify victim resources and request workloads be transitioned to identified resources.

At 716, the cloud platform control plane 704 can send an indication to the repaver 706 to update a scheduler. This scheduler can exclude a victim pod/node/computing instance from obtaining/executing corresponding workloads.

At 718, the cloud platform control plane 704 can send a cloud platform control plane response to a user space detector 702. This can be sent responsive to updating the scheduler and transitioning resources.

At 720, the user space detector 702 can update encryption KPIs. This can be performed responsive to a successful receipt of the cloud control plane response of 718. Updating the encryption KPIs can include updating a memory map with a type of memory, encryption types, and an address range/bucket.

At 722, the user space detector 702 can send an error message to a logging service 708. This can be sent in the event that a failure occurred in updating the bitmap.

At 724, the user space detector 702 can send a status of whether memory has been swept to cloud platform control plane 704.

At 726, a second workflow is initiated at cloud platform control plane 704. The second workflow can include a state transition and database updates.

At 728, the cloud platform control plane 704 can send a notification to continue with the repaver schedule if the memory sweep is not complete to the repaver 506. The continuation with the same schedule can be with a same repaver node set and a same repaver algorithm.

Figure 8:
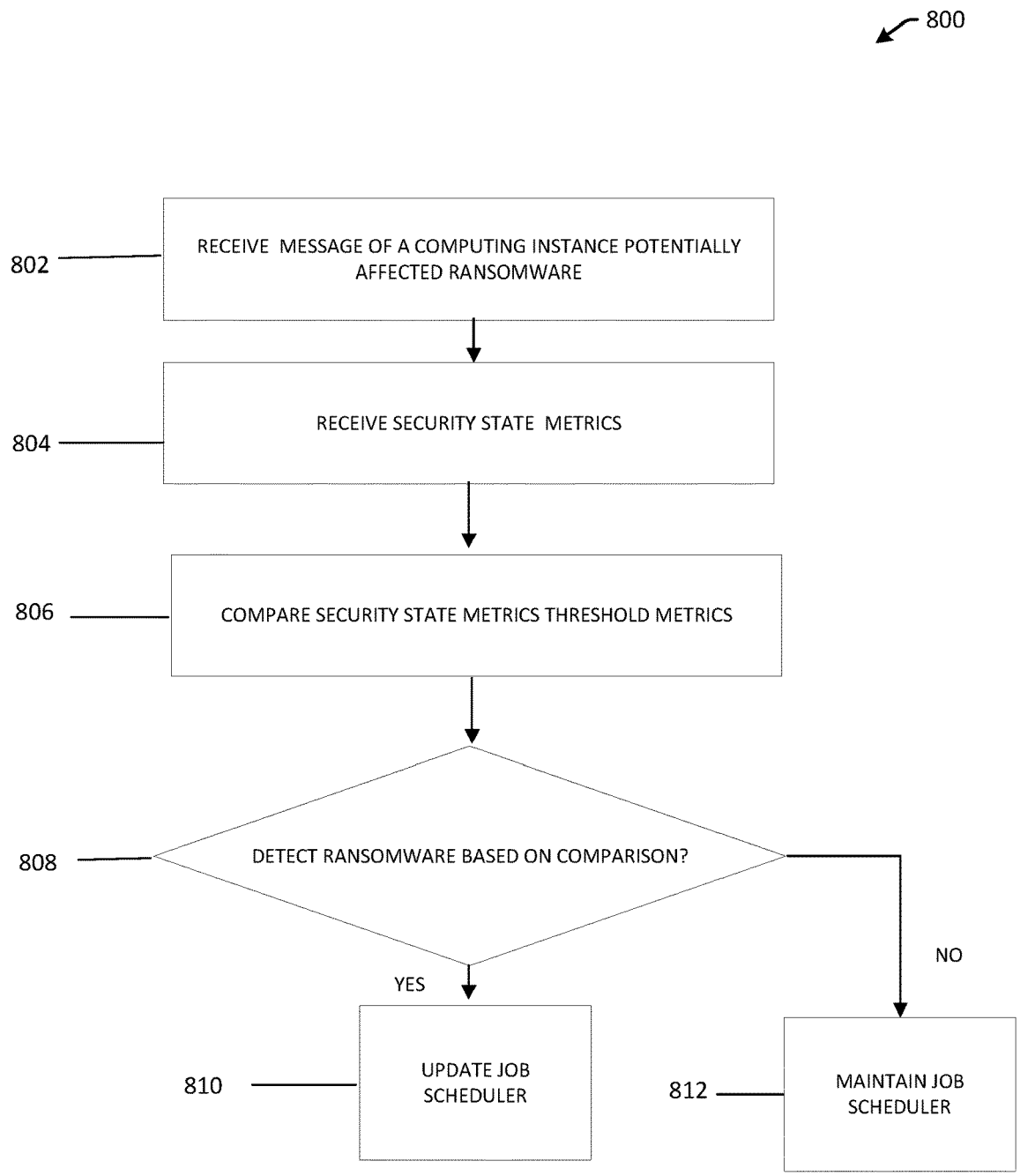
FIG. 8 is a block diagram of an example process for identifying ransomware, according to one or more embodiments.

FIG. 8 illustrates a process 800 for identifying a ransomware attack, according to some embodiments. At 802, a computing device can receive an indication of a computing instance being infected by ransomware. The indication can be based on, for example, a modification of a memory mapping from a cache to system memory. The indication can also be based on a number of attempted transitions from a non-secure state to a secure state.

At 804, the computing device can receive security state-related metrics. The metrics can be collected from another entity and be based on an application profile, system usage (e.g., duration, how often an instance has been created, number of times a user has logged on, and other disk level thresholds). The metrics can include, for example, a number of times that a processor invokes an EL indicative of a secure state. Another metric can be a length of time that a computing instance operated in a secure state. Yet another metric can be a number of times that a transition into a secure state failed. Yet even another metric can be a number of requests to invoke a secure state transition that returned a "too many requests error."

At 806, the computing device can compare the collected metrics to KPI-based threshold values. At 808 if, based on the comparison the computing device detects ransomware, the process 800 proceeds to 810.

At 810, the computing device can notify a job scheduler to route future jobs away from the affected computing instance.

If, however, the computing device did not detect ransomware, the process 800 proceeds to 812. At 812, the computing device does not send a notification to the job scheduler to route future jobs away from the computing instance.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing, and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first need to be set up. In some instances, the provisioning can be done manually, a provisioning tool may be utilized to provision the resources, and/or deployment tools may be utilized to deploy the code once the infrastructure is provisioned.

Figure 9:
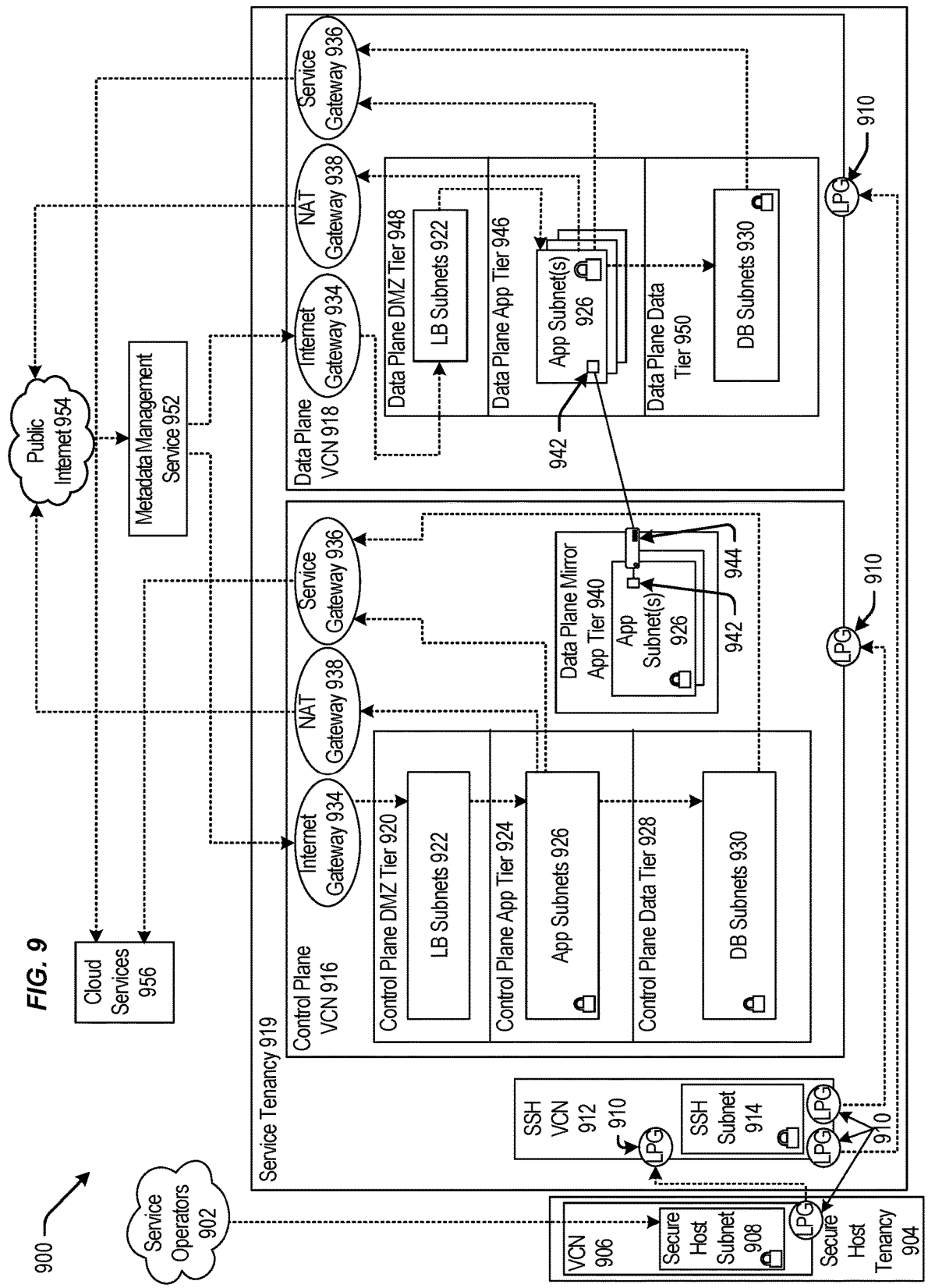
FIG. 9 is a block diagram illustrating a pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 14, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively coupled to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. A memory that may be desired to store the request can be provided in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
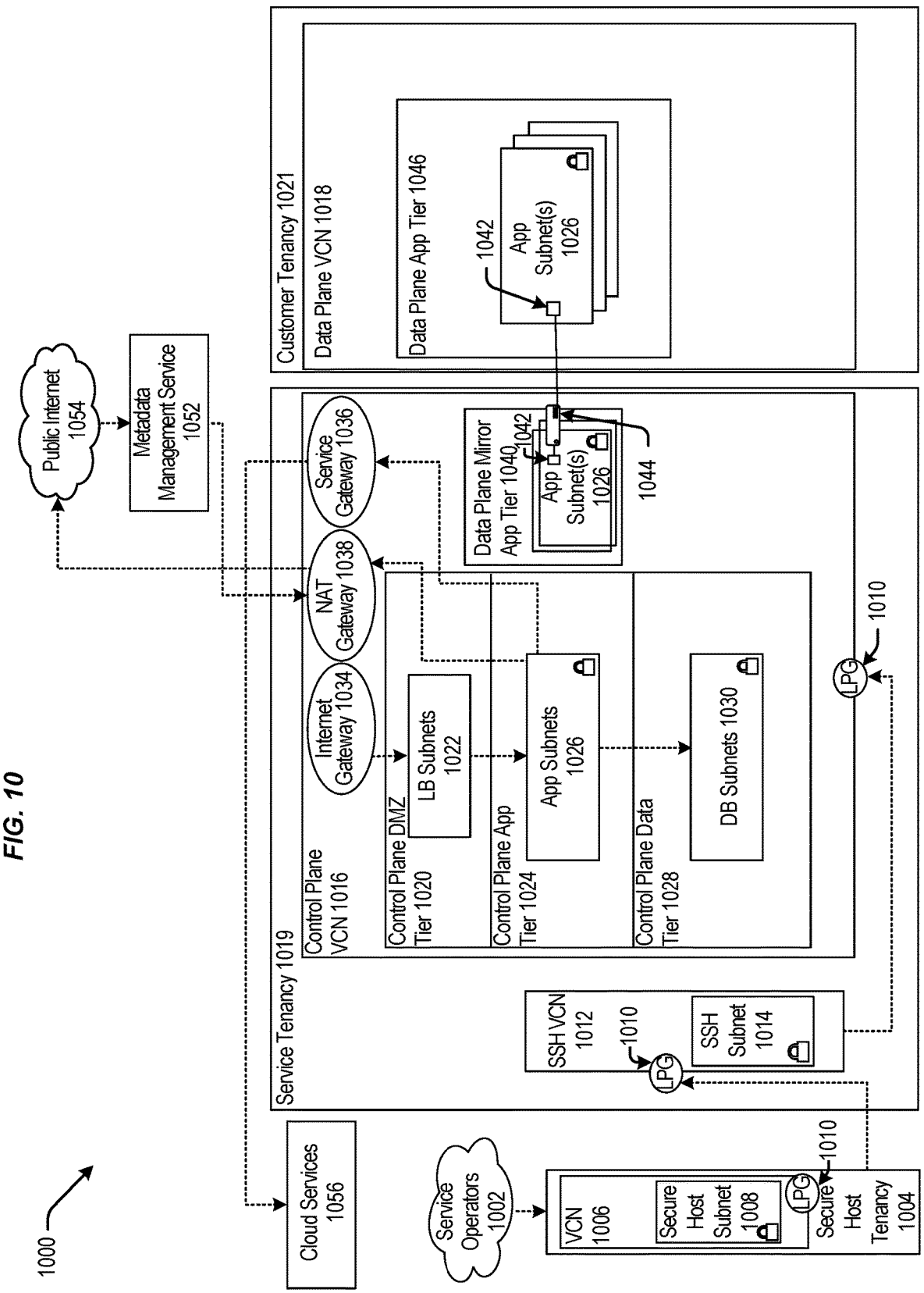
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1076 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 1010 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 936 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942 of FIG. 9) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 1046 of FIG. 10) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 902 of FIG. 9) that can be communicatively coupled to public Internet 1054 (e.g., public Internet 904 of FIG. 9). Public Internet 1054 can be communicatively coupled to the NAT gateway 1038 contained in the control plane VCN 1016. The service gateway 1036 contained in the control plane VCN 1016 can be communicatively coupled to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 1," may be located in Region 1 and in "Region 2." If a call to Deployment 1 is made by the service gateway 1036 contained in the control plane VCN 1016 located in Region 1, the call may be transmitted to Deployment 1 in Region 1. In this example, the control plane VCN 1016, or Deployment 1 in Region 1, may not be communicatively coupled to, or otherwise in communication with, Deployment 2 in Region 2.

Figure 11:
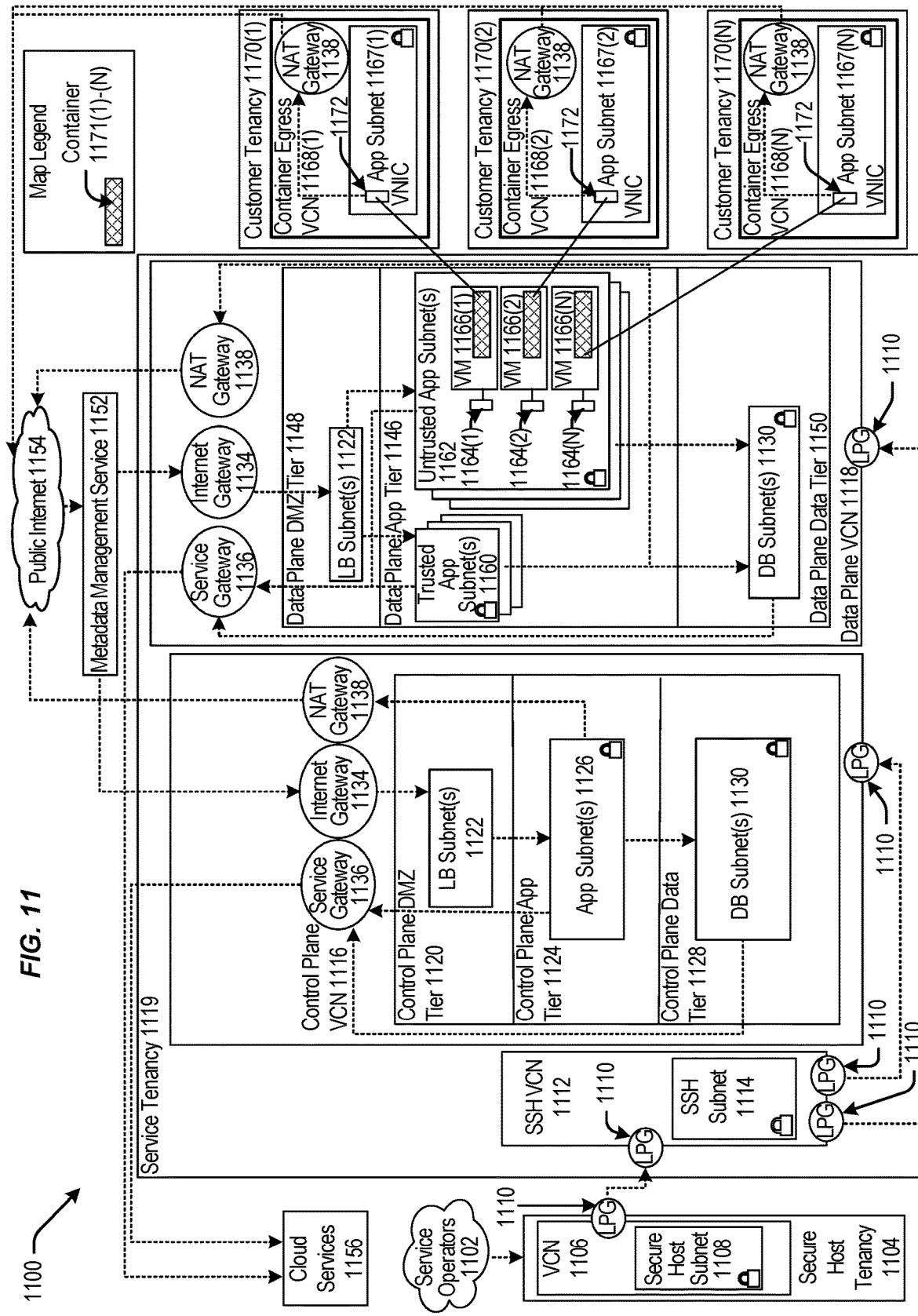
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 1106 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112

(e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway 936 of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9). The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively coupled to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
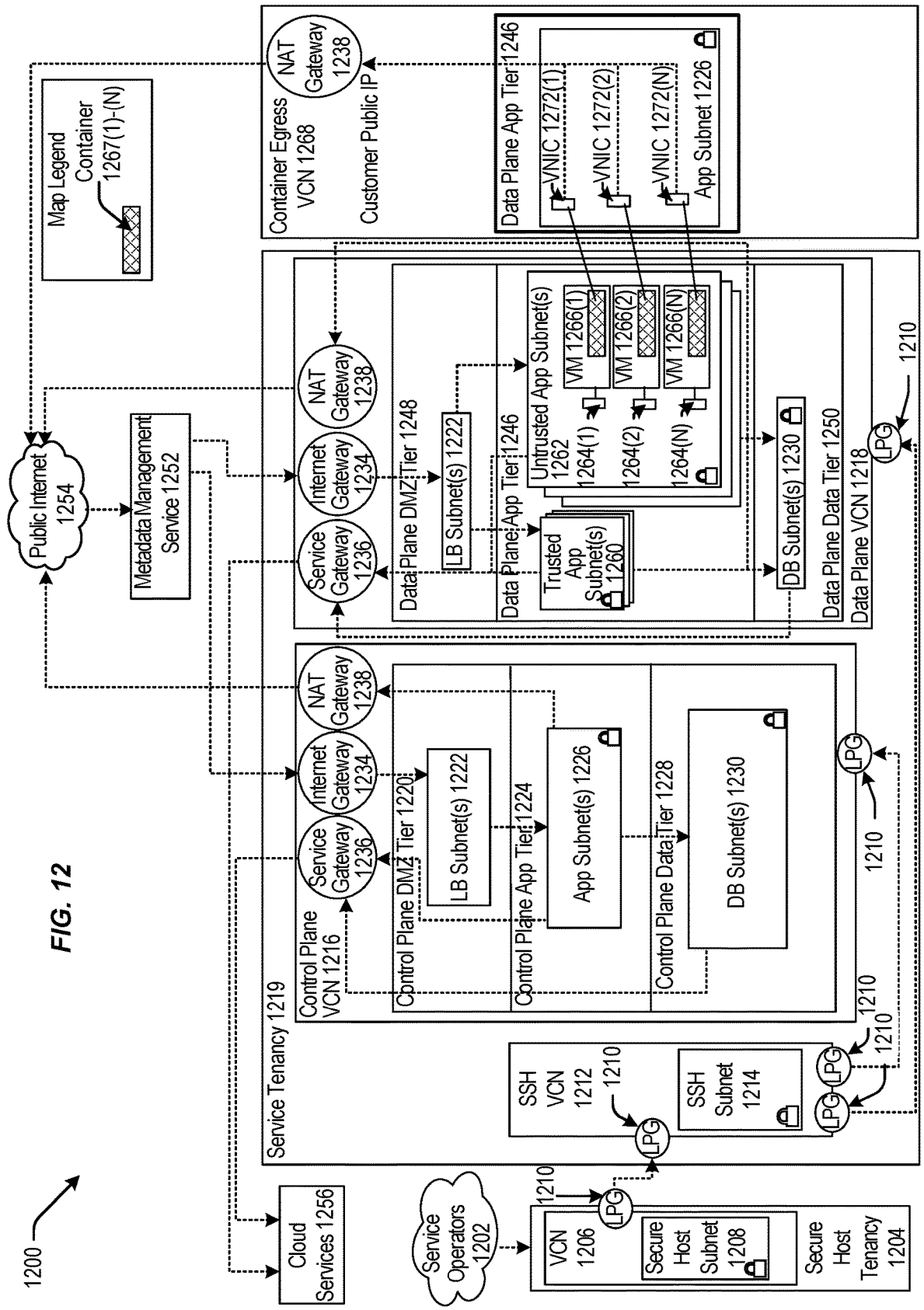
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 930 of FIG. 9). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway 936 of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively coupled to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N), that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
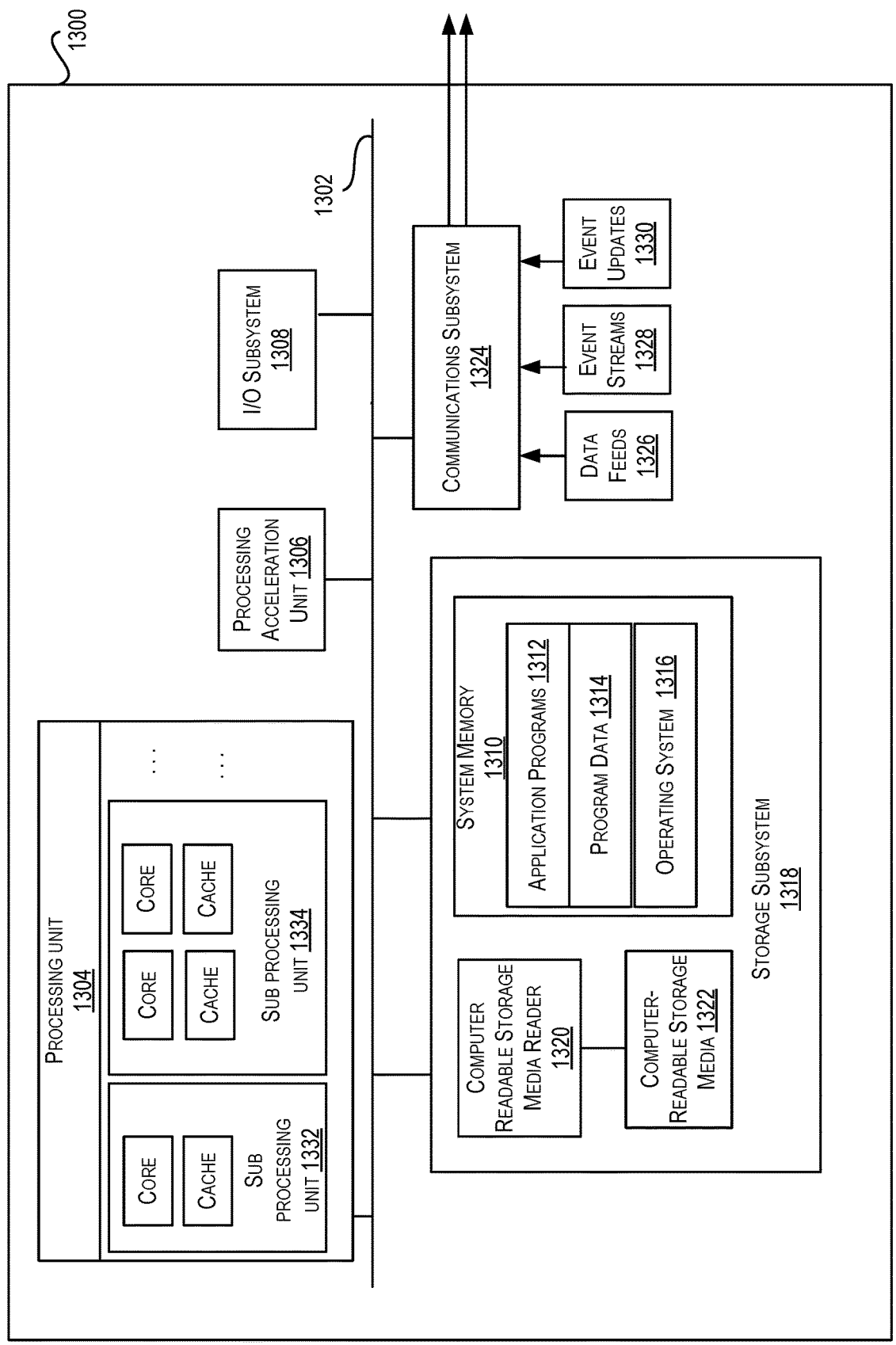
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present disclosure.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer-readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 302.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   detecting that a computing instance is potentially infected by ransomware;
   triggering an operation that monitors transitions in a cache associated with an exception level of a processor of the computing instance, wherein the operation comprises:
      collecting a security metric associated with the exception level of the processor, wherein:
         the security metric comprises a number of times the processor utilizes an exception level indicating a secure state of the processor;
      comparing the security metric to a threshold metric; and
      determining that a ransomware attack occurred based at least in part on the comparing of the security metric to the threshold metric; and
   transmitting a message to a job scheduler to reschedule workloads directed toward the computing instance based at least in part on the determination that the ransomware attack occurred.

2. The computer-implemented method of claim 1, wherein detecting that the computing instance is potentially infected by ransomware comprises:
   detecting a modification of a mapping of a cache location to a memory location.

3. The computer-implemented method of claim 1, wherein detecting that the computing instance is potentially infected by ransomware comprises:

detecting that a number of attempted transitions to a secure state by the computing instance exceeds a threshold number.

4. The computer-implemented method of claim 1, wherein the method further comprises migrating the workloads away from the computing instance.

5. The computer-implemented method of claim 1, wherein the method further comprises:
   generating a first cryptographic bitmap comprising a first row of encryption-related data associated with a cache,
   generating a second cryptographic bitmap comprising a second row of encryption-related data associated with the cache;
   performing, on the first row and the second row, a mathematical exclusive operation to derive a delta value;
   comparing the delta value to a threshold value,
   wherein determining that the ransomware attack occurred is further based on comparing-the delta value to the threshold value.

6. The computer-implemented method of claim 1, wherein the method further comprises repaving the computing instance based at least in part on the determination that the ransomware attack occurred.

7. The computer-implemented method of claim 1, wherein:
   the exception level is one of a plurality of exception levels associated respectively with privilege levels for accessing one or more secure resources.

8. A cloud infrastructure node, comprising:
   a processor; and
   a computer-readable medium including instructions that, when executed by the processor, cause the processor to:
      detecting that a computing instance is potentially infected by ransomware;
      trigger an operation that monitors transitions in a cache associated with an exception level of a processor of the computing instance, wherein the operation comprises:
         collecting a security metric associated with the exception level of the processor, wherein:
            the security metric comprises a number of times the processor utilizes an exception level indicating a secure state of the processor;
      compare the security metric to a threshold metric; and
      determine that a ransomware attack occurred based at least in part on the comparing of the security metric to the threshold metric; and
      transmit a second message to a job scheduler to reschedule workloads directed toward the computing instance based at least in part on the determination that the ransomware attack occurred.

9. The cloud infrastructure node of claim 8, wherein detecting that the computing instance is potentially infected by ransomware comprises:
   detecting a modification of a mapping of a cache location to a memory location.

10. The cloud infrastructure node of claim 8, wherein detecting that the computing instance is potentially infected by ransomware comprises:
   detecting that a number of attempted transitions to a secure state by the computing instance exceeds a threshold number.

11. The cloud infrastructure node of claim 8, wherein the instructions further cause the processor to migrate the workloads away from the computing instance.

12. The cloud infrastructure node of claim 8, wherein the instructions further cause the processor to:
   generate a first cryptographic bitmap comprising a first row of encryption related data associated with a cache,
   generating a second cryptographic bitmap comprising a second row of encryption related data associated with the cache;
   perform, on the first row and the second row, a mathematical exclusive operation to derive a delta value;
   comparing the delta value to a threshold value,
   wherein determining that the ransomware attack occurred is further based on comparing-the delta value to the threshold value.

13. The cloud infrastructure node of claim 8, wherein the instructions further cause the processor to repave the computing instance based at least in part on the determination that the ransomware attack occurred.

14. The cloud infrastructure node of claim 8, wherein:
   the exception level is one of a plurality of exception levels associated respectively with privilege levels for accessing one or more secure resources.

15. A non-transitory computer-readable medium including stored thereon a sequence of instructions that, when executed by a processor of a cloud infrastructure node, causes the processor to perform operations comprising:
   detecting that a computing instance is potentially infected by ransomware;
   triggering an operation that monitors transitions in a cache associated with an exception level of a processor of the computing instance, wherein the operation comprises:
      collecting a security metric associated with the exception level of the processor, wherein:
         the security metric comprises a number of times the processor utilizes an exception level indicating a secure state of the processor;
   comparing the security metric to a threshold metric; and
   determining that a ransomware attack occurred based at least in part on the comparing of the security metric to the threshold metric; and
   transmitting a second message to a job scheduler to reschedule workloads directed toward the computing instance based at least in part on the determination that the ransomware attack occurred.

16. The non-transitory computer-readable medium of claim 15, wherein detecting that the computing instance is potentially infected by ransomware comprises:
   detecting a modification of a mapping of a cache location to a memory location.

17. The non-transitory computer-readable medium of claim 15, wherein detecting that the computing instance is potentially infected by ransomware comprises:
   detecting that a number of attempted transitions to a secure state by the computing instance exceeds a threshold number.

18. The non-transitory computer-readable medium of claim 15, wherein the operations further comprise migrating the workloads away from the computing instance.

19. The non-transitory computer-readable medium of claim 15, wherein the operations further comprise:
   generating a first cryptographic bitmap comprising a first row of encryption related data associated with a cache,
   generating a second cryptographic bitmap comprising a second row of encryption related data associated with the cache;
   performing, on the first row and the second row, a mathematical exclusive operation to derive a delta value;

comparing the delta value to a threshold value,
wherein determining that the ransomware attack occurred is further based on comparing-the delta value to the threshold value.

20. The non-transitory computer-readable medium of claim 15, wherein:
the exception level is one of a plurality of exception levels associated respectively with privilege levels for accessing one or more secure resources.

* * * * *